Dec. 15, 1931.  E. A. BROOKS  1,837,146
FURNACE WALL AND METHOD OF MAKING THE SAME
Filed Sept. 9, 1930
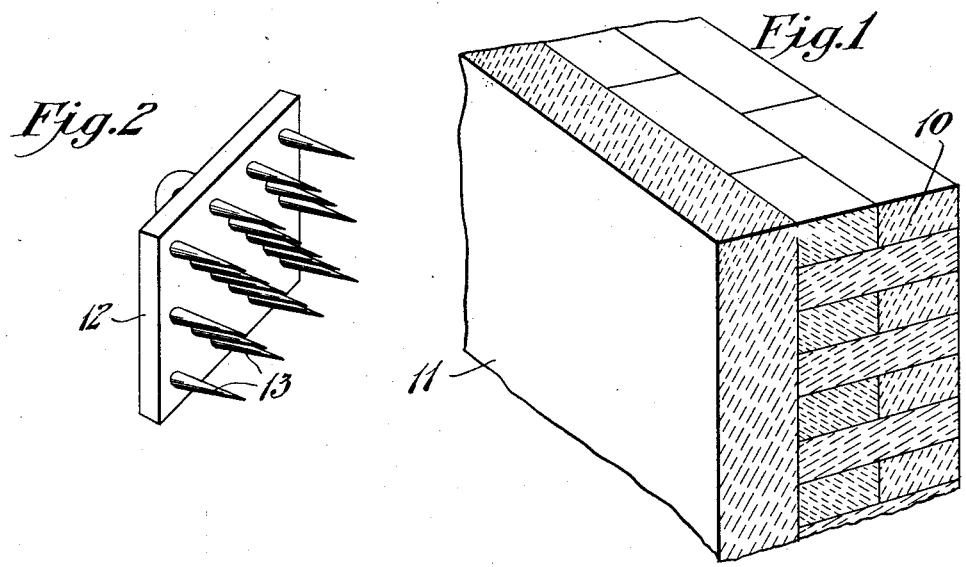
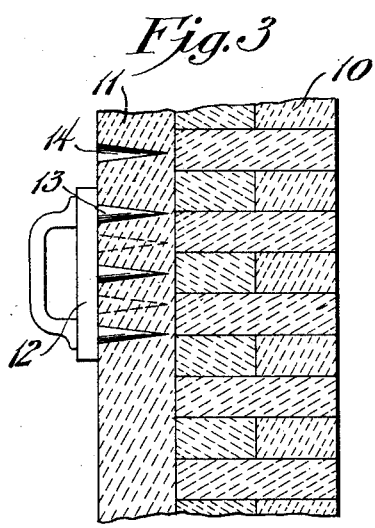
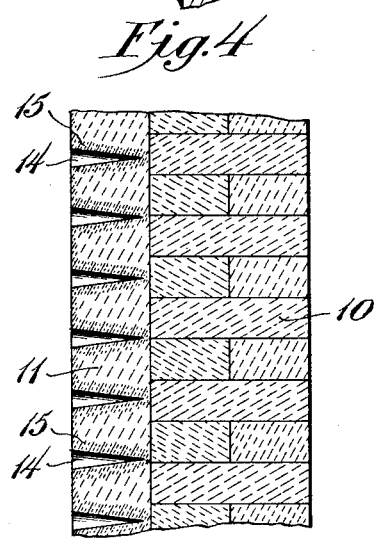
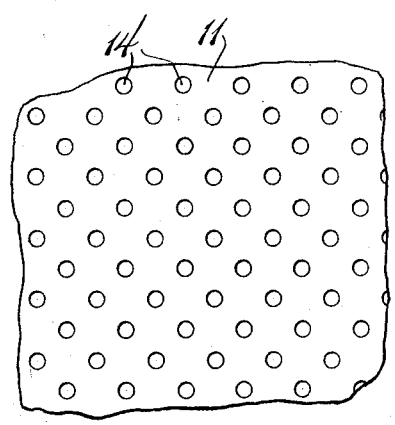
INVENTOR
E. A. Brooks
BY
Siggers & Adams
ATTORNEYS Patented Dec. 15, 1931

1,837,146

UNITED STATES PATENT OFFICE

EUGENE A. BROOKS, OF ATLANTA, GEORGIA

FURNACE WALL AND METHOD OF MAKING THE SAME

Application filed September 9, 1930. Serial No. 480,772.

This invention relates to furnace walls and linings and, among other objects, aims to prolong the life and strengthen refractory linings or moulded refractory walls such as are used in various types of furnaces. One of the aims is to provide an improved simple and practicable method of treating walls and linings after they have been moulded or otherwise formed so as to promote more uniform setting or hardening and to produce vitrified strengthening portions in the form of hollow stays upon exposure of the treated portions to the furnace heat.

Other aims and advantages of the invention will appear in the specification when considered in connection with the accompanying drawings, wherein:

Fig. 1 is a fragmentary view of an ordinary furnace wall having a refractory lining;

Fig. 2 is a perspective view of an indenting implement adapted to be used in practicing the method;

Fig. 3 is a fragmentary sectional view of the wall in Fig. 1 showing the indenting implement being applied;

Fig. 4 is another fragmentary sectional view showing the finished wall after the refractory lining is set and partially vitrified by exposure to the furnace heat; and Fig. 5 is a fragmentary face view of an indented wall or lining.

It is a well known fact that refractory furnace walls or linings do not set properly or uniformly throughout their thickness because the furnace heat does not penetrate them to a sufficient depth. In some cases where good fire clay is used, very intense heat will bake and set the lining to a depth of only a fraction of its thickness. The setting is largely influenced by the temperature, and the physical and chemical characteristics of the refractory materials employed. In most cases, the furnace heat produces a hard, baked and sometimes vitrified crust or shell on the inner face of the wall, while the other part not subjected to direct or intense radiant heat is relatively soft and will crumble easily. This condition grows worse in proportion to the distance from the surface exposed to the heat or the wall thickness. In fact, many failures of walls or linings have occurred where the thickness has exceeded about four inches, and a failure is frequently very costly because the entire furnace must be shut down until the expensive repairs are made. This has resulted in shutting down entire plants, temporarily stopping production and throwing men out of employment.

It is necessary to make some refractory walls very thick to withstand high furnace temperatures and rough usage. However, it is very important that they shall set properly so as to prolong their lives of usefulness. The common methods of building them and applying the heat have militated against making linings of the proper thickness. My invention therefore aims to provide a strong and durable wall or lining and an improved method of making it which will insure proper setting at any reasonable depth and which, when baked, is self strengthening or reinforcing by virtue of the mere application of heat. Moreover, the idea is to prevent failure by cracking and/or by expansion and contraction.

Plastic refractory linings are usually applied or shot on by means of a "cement gun", although walls and linings may be molded. However applied, the linings usually have a more or less smooth finish. Now I have discovered that by indenting the inner surfaces with a multiplicity of small holes to a considerable depth in the lining, the heat is permitted to penetrate the material more uniformly and will produce much better setting and, hence, a much stronger wall. The wall or lining will not only burn and harden throughout, but also, the wall of the indentations will vitrify and produce, in effect, hollow reinforcing stays which serve to tie the whole mass together.

Referring particularly to the drawings there is shown an illustrative furnace wall 10 which may be made of brick having an inner lining 11 of plastic fire clay or other refractory applied thereto in any convenient manner. While the lining is green and somewhat plastic, the indentations may be made in it either by forcing wooden pins into it or by making pin prints or impressions, using a suitable tool for the purpose. In this example, an implement comprising a board 12 having a series of properly spaced pegs or conical pins 13 is preferred. The pegs are tapered so that they may be easily pulled out without damaging the lining. However, their particular shape and size may be varied considerably. Furthermore, the pegs may be loosely mounted in sockets or holes in the board and the board used to stick them into the wall to remain until they are burned out. The pegs are preferably, though not necessarily, arranged in staggered rows and spaced uniformly and their lengths are only slightly less than the thickness of the lining. They should not be so close together as to materially weaken the lining, nor so far apart as to prevent proper heat penetration. Holes of about a half inch in diameter spaced approximately two and a half inches from centers to centers have produced very satisfactory results.

In Fig. 3, the lining is being indented by the simple implement; while Fig. 4 shows the completed burned lining having conical holes or indentations 14, the walls of which are vitrified to produce transverse pencil-like shells or stays 15. The burning temperature should be sufficiently high to produce surface vitrification. These stays effectively pin the entire mass together and prevent any weak part of the lining from crumbling or falling. Moreover, the vitrified shells or stays become thicker and stronger as they are exposed to ordinary furnace temperatures. Also, the holes permit normal expansion and contraction of the lining without breakage.

The method is applicable to the refractory ceilings and bottom walls as well as to arches of furnaces. The term "wall" as used herein is therefore intended to define all of them or all refractory parts of a furnace exposed to heat.

Having thus described an illustrative embodiment of the invention including the preferred steps of the method, but without restricting myself to all of the specific details described, what I claim and desire to secure by Letters Patent is:

1. A monolithic furnace wall composed of plastic, fire resisting material having a plurality of indentations produced in the wall while the material is plastic and so arranged as to permit the furnace heat to penetrate the entire mass whereby to promote permanent setting.

2. A refractory furnace lining having a multiplicity of small, transverse indentations which penetrate the lining through a substantial portion of its thickness; the walls of said indentations being baked and vitrified to provide hollow reinforcing stays.

3. That method of treating furnace walls or linings made of plastic refractory material, which is characterized by producing a multiplicity of deep indentations therein to permit heat to penetrate the mass throughout substantially its entire thickness; and subsequently exposing the wall to sufficient heat to harden the mass so that the walls of the holes produce transverse reinforcing stays.

4. That method of treating furnace walls or linings made of plastic refractory material, which is characterized by piercing the inner faces to produce a multiplicity of tapered indentations while the plastic material is still relatively soft; and exposing the mass to intense heat so as to produce permanent setting and surface virtification, whereby the walls of the indentations provide transverse reinforcing stays and pin the mass together.

5. That method of treating furnace walls and linings made of plastic refractory material, which is characterized by indenting the inner face to a substantially uniform depth with a multiplicity of conical pegs; removing the pegs; and subsequently exposing the wall to furnace heat so as to produce a permanent and practically uniform set throughout the thickness of the refractory material.

In testimony, that I claim the foregoing as my own, I have hereto affixed my signature.

EUGENE A. BROOKS.